(12) United States Patent
Coquille et al.

(10) Patent No.: US 7,885,544 B2
(45) Date of Patent: Feb. 8, 2011

(54) DEVICE FOR TEMPORAL SUBSAMPLING OF AN OTDM OPTICAL SIGNAL, OTDM-WDM CONVERTER COMPRISING SAME AND OTDM-WDM CONVERTER

(75) Inventors: René Coquille, Lannion (FR); Erwan Pincemin, Gommenee'h (FR); Didier Grot, Pleumeur-Bodou (FR); Albert Luron, Rospez (FR)

(73) Assignee: France Telecom, Paris (FR)

( * ) Notice: Subject to any disclaimer, the term of this patent is extended or adjusted under 35 U.S.C. 154(b) by 1093 days.

(21) Appl. No.: 10/585,357

(22) PCT Filed: Jan. 6, 2004

(86) PCT No.: PCT/FR2004/000009

§ 371 (c)(1),
(2), (4) Date: Sep. 15, 2006

(87) PCT Pub. No.: WO2005/076508

PCT Pub. Date: Aug. 18, 2005

(65) Prior Publication Data

US 2007/0183710 A1    Aug. 9, 2007

(51) Int. Cl.
*H04J 4/00* (2006.01)
(52) U.S. Cl. .............................. 398/75; 398/77; 398/78
(58) Field of Classification Search ............... 398/24, 398/155–156, 175–176, 75–79
See application file for complete search history.

(56) References Cited

U.S. PATENT DOCUMENTS 6,646,784 B2 * 11/2003 Leuthold ................... 359/332

6,832,053 B2 * 12/2004 Leuthold ................... 398/175

(Continued)

FOREIGN PATENT DOCUMENTS

EP    1 137 213 A2    9/2001

(Continued)

OTHER PUBLICATIONS

Leuthold et al., "Linear all-optical wavelength conversion based an linear optical amplifier," Institute of Electrical and Electronics Engineers, Optical Fiber Communication Conference and Exhibit, Technical Digest, Postconference Digest, vol. 70, Mar. 17, 2002, pp. 597-598.

(Continued)

*Primary Examiner*—Dzung D Tran
(74) *Attorney, Agent, or Firm*—Oliff & Berridge, PLC

(57) ABSTRACT

The invention concerns a device for temporal subsampling of an OTDM optical signal at a predetermined subsampling frequency, comprising a generator (10) for generating clock pulses transmitted at the predetermined subsampling frequency and at a conversion wavelength $\lambda_H$ and a wavelength converter device (16) adapted to receive at its input the OTDM optical signal and the clock pulses in order to deliver at its output a subsampled OTDM optical signal at the conversion wavelength. The converter device comprises a linear optical amplifier (18) adapted to receive the OTDM optical signal and the clock pulses propagating in the opposite direction, the maximum linear power of the conversion being adjusted so that it can be less than the peak power of the OTDM optical signal, and a converter (20) of phase modulation into amplitude modulation.

5 Claims, 3 Drawing Sheets

U.S. PATENT DOCUMENTS

2005/0226623 A1* 10/2005 Pincemin .................... 398/98

FOREIGN PATENT DOCUMENTS

WO      WO 03/007068 A1     1/2003

OTHER PUBLICATIONS

Rau et al., "Simultaneous All-Optical Demultiplexing of a 40-Gb/s Signal to 4 x 10 Gb/s WDM Channels Using an Ultrafast Fiber Wavelength Converter," IEEE Photonics Technology Letters, vol. 14, No. 12, Dec. 2002, pp. 1725-1727.

* cited by examiner

DEVICE FOR TEMPORAL SUBSAMPLING OF AN OTDM OPTICAL SIGNAL, OTDM-WDM CONVERTER COMPRISING SAME AND OTDM-WDM CONVERTER

The present invention relates to a device for temporal subsampling of an OTDM optical signal, an OTDM-WDM converter comprising the device, and a WDM-OTDM converter.

An OTDM (optical time-division multiplex) type signal is an optical signal that is produced by time-division multiplexing source optical signals.

A WDM (wavelength-division multiplex) type signal is an optical signal that is produced by wavelength-division multiplexing source optical signals.

More precisely, the invention relates to a device for temporal subsampling of an OTDM optical signal at a predetermined subsampling frequency, of the type comprising:
- a generator for generating clock pulses transmitted at the predetermined subsampling frequency and at a conversion wavelength, and
- a wavelength converter device receiving at its input the OTDM type optical signal and the clock pulses and supplying at its output a subsampled signal of the optical signal at the conversion wavelength.

A subsampling device of the above type is described in the document entitled "Simultaneous All-Optical Demultiplexing of a 40-Gb/s Signal to 4×10 Gb/s WDM Channels Using an Ultrafast Fiber Wavelength Converter", by L. Rau et al., published in IEEE PHOTONICS TECHNOLOGY LETTERS, Volume 14, No. 12, December 2002. That document describes a temporal subsampling device including a wavelength converter device consisting of a crossed phase modulator associated with a WDM filter, such as an arrayed waveguide router. That temporal subsampling device is generally difficult to use and not very resistant to environmental interference, such as temperature changes, vibration, etc.

The invention also relates to a converter for converting a WDM type optical signal into an OTDM type optical signal, the WDM type optical signal consisting of a plurality of multiplexed optical signals each transmitted at its own wavelength, the converter including a generator for generating a continuous wave signal transmitted at a predetermined conversion wavelength and at least one wavelength converter device receiving the continuous wave signal and the wavelength-division multiplexed optical signals at its input and providing at its output an OTDM type optical signal transmitted at a temporal frequency that is a multiple of the common frequency of the wavelength-division multiplexed optical signal.

A converter of the above kind is described in the document entitled "WDM to OTDM Multiplexing Using an Ultrafast All-Optical Wavelength Converter", by B-E. Olsson et al., published in IEEE PHOTONICS TECHNOLOGY LETTERS, Volume 13, No. 9, September 2001. That document describes a WDM-OTDM converter including a wavelength converter device consisting of a crossed-phase modulator associated with a filter, such as a Bragg fiber. That converter is also difficult to use and not very resistant to environmental interference, such as temperature changes, vibration, etc.

The above-mentioned temporal subsampling device and converter are also not suitable for OTDM type signals transmitted at frequencies of the order of 160 giga hertz (GHz) and above.

The invention aims to overcome those problems by providing a temporal subsampling device, an OTDM-WDM converter, and a WDM-OTDM converter that are simple and reliable and that can process OTDM signals at 160 GHz and above.

The invention therefore consists of a device of the above-specified type for temporal subsampling of an OTDM type optical signal at a predetermined subsampling frequency, characterized in that the converter device comprises a linear optical amplifier adapted to receive the OTDM type optical signal and the clock pulses propagating in the opposite direction, the maximum linear power of the amplifier being adjusted so that it can be less than the peak power of the OTDM type optical signal and a phase modulation to amplitude modulation converter.

A temporal subsampling device of the invention may also have one or more of the following features:
- the phase modulation to amplitude modulation converter includes a delayed differential Mach-Zehnder interferometer,
- the device includes a circulator between the amplifier and the modulation converter in order to direct the OTDM optical signal to the amplifier, and the output signal of the amplifier to the modulation converter.

The invention also consists of a converter for converting an OTDM type optical signal into a WDM type optical signal, characterized in that it comprises a plurality of temporal subsampling devices as described above connected in parallel, each temporal subsampling device including a generator of clock pulses transmitted at a predetermined subsampling frequency and at a conversion wavelength specific to the subsampling device, and a wavelength converter device receiving at its input the OTDM type signal and the clock pulses at the conversion wavelength specific to the subsampling device.

Finally, the invention also consists of a converter of the above-specified type for converting a WDM type optical signal into a OTDM type optical signal, characterized in that the converter device comprises, firstly, a linear optical amplifier adapted to receive the continuous wave optical signal and the wavelength-division multiplexed optical signals propagating in the opposite direction, the maximum linear power of the amplifier being adjusted so that it can be less than the peak power of the wavelength-division multiplexed optical signals and, secondly, a phase modulation to amplitude modulation converter.

A WDM-OTDM converter of the invention may further have one or more of the following features:
- it includes means for time shifting wavelength-division multiplexed optical signals relative to each other and a single converter device adapted to receive at its input the time shifted wavelength-division multiplexed optical signals;
- it includes a plurality of converter devices connected in parallel, each converter device being adapted to receive at its input one of the wavelength-division multiplexed optical signals and being associated with a specific time-shifting device;
- the phase modulation to amplitude modulation converter includes a delayed differential Mach-Zehnder interferometer;
- it includes at least one circulator between each amplifier and each modulation converter in order to direct the wavelength-division multiplexed optical signals to the amplifier and the output signal of the amplifier to the modulated signal converter.

Coupling a linear optical amplifier and a phase modulator to amplitude modulation converter, for example a delayed differential Mach-Zehnder interferometer, achieves wavelength conversion by the Kramers-Krönig principle. According to the Kramers-Krönig principle, modification of the density of the charge carriers in the linear optical amplifier, which occurs when the amplifier is operating in its non-linear region, changes the refractive index of the propagation medium. Thus if the peak power of the signal to be converted is greater than the maximum linear power of the amplifier, i.e. if the signal to be converted is carrying a binary "1", the conversion signal that propagates in the amplifier in the opposite direction is phase shifted. In contrast, if the peak power of the signal to be converted is less than the maximum linear power of the amplifier, i.e. if the signal to be converted is carrying a binary "0", the conversion signal that propagates in the amplifier in the opposite direction is not phase shifted. The conversion signal then carries in phase-modulated form the information carried by the signal to be converted. It is then passed through the modulation converter, so that the information is amplitude modulated, like the signal to be converted.

This achieves simple wavelength conversion making it possible to design an all-optical subsampling device, an all-optical OTDM-WDM converter, and an all-optical WDM-OTDM converter, that are simple and that can process OTDM signals at a frequency of at least 160 GHz.

The invention can be better understood in the light of the following description, which is given by way of example only and with reference to the appended drawings, in which.

Figure 1:
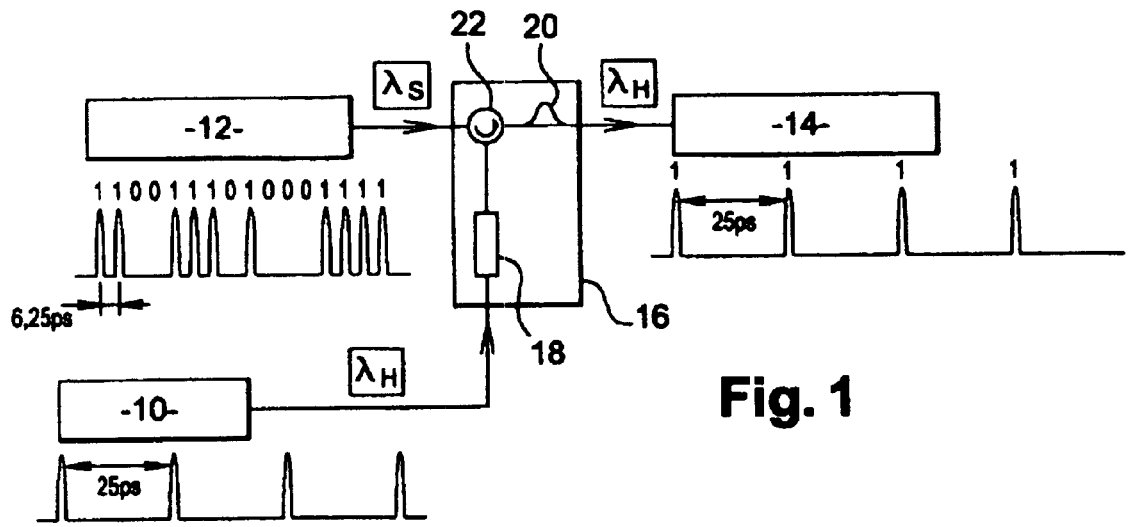
FIG. 1 is a diagram of the structure of a subsampling device of the invention.

The temporal subsampling device shown in FIG. 1 includes a generator 10 of clock pulses transmitted at a predetermined subsampling frequency, for example 40 giga bits per second (Gbps). The clock pulses are therefore spaced by 25 picoseconds (ps). The wavelength of this stream of pulses, called the conversion wavelength, is also predetermined and takes a value $\lambda_H$=1544.5 nanometers (nm), for example.

The device further includes an OTDM type optical signal receiver 12, i.e. a receiver for receiving signals produced by time-division multiplexing optical signals. This optical signal is transmitted at a frequency of 160 GHz, for example, i.e. the pulses are spaced by 6.25 ps.

This optical signal is transmitted at a wavelength $\lambda_S$=1555.5 nm, for example.

This OTDM type optical signal is to be subsampled and converted to the conversion wavelength of the pulse stream transmitted by the generator 10 in order to supply at the output of the temporal subsampling device one of the multiplexed signals constituting the OTDM optical signal. To this end, the subsampling device includes a connection interface 14 supplying that output signal.

Finally, the subsampling device includes a wavelength converter device 16 receiving at its input the OTDM type optical signal and the clock pulses supplied by the generator 10.

The converter device includes a linear optical amplifier 18 that receives the OTDM type optical signal and the clock pulses propagating in the opposite direction.

To this end, a first terminal of the linear optical amplifier 18 is connected directly to the output of the clock pulse generator 10 and a second terminal of the linear optical amplifier is connected to a circulator 22 between the receiver 12 and the amplifier 18 in order to direct the OTDM type optical signal to that second terminal.

The maximum linear power of the linear optical amplifier 18 is adjusted so that it can be less than the peak power of the OTDM type optical signal.

Finally, the wavelength converter device 16 includes a phase modulation to amplitude modulation converter 20. The phase modulation to amplitude modulation converter is preferably a delayed differential Mach-Zehnder interferometer.

The circulator 22 is between the linear optical amplifier 18 and this modulation converter in order to direct the output signals at the second terminal of the linear optical amplifier to this modulation converter.

The device described above operates in the following manner:

if the peak power of the OTDM type optical signal is greater than the maximum linear power of the amplifier 18, i.e. if the OTDM type signal is carrying a binary "1", and if that binary "1" corresponds to a clock pulse that is propagating in the opposite direction in the amplifier, the clock pulse is phase shifted (preferably by an amount $\pi$);

if the peak power of the OTDM type signal is less than the maximum linear power of the amplifier 18, i.e. if the OTDM type signal is carrying a binary "0", and if that binary "0" corresponds to a pulse that is propagating in the opposite direction in the amplifier 18, the pulse is not phase shifted;

the pulse stream is then passed through the delayed differential Mach-Zehnder interferometer to convert the phase modulation of the output signal of the temporal subsampling device into amplitude modulation.

The temporal signal obtained at the output is subsampled at one quarter of the temporal frequency of the OTDM type signal, subject to wavelength conversion, from $\lambda_S$ to $\lambda_H$.

Figure 2:
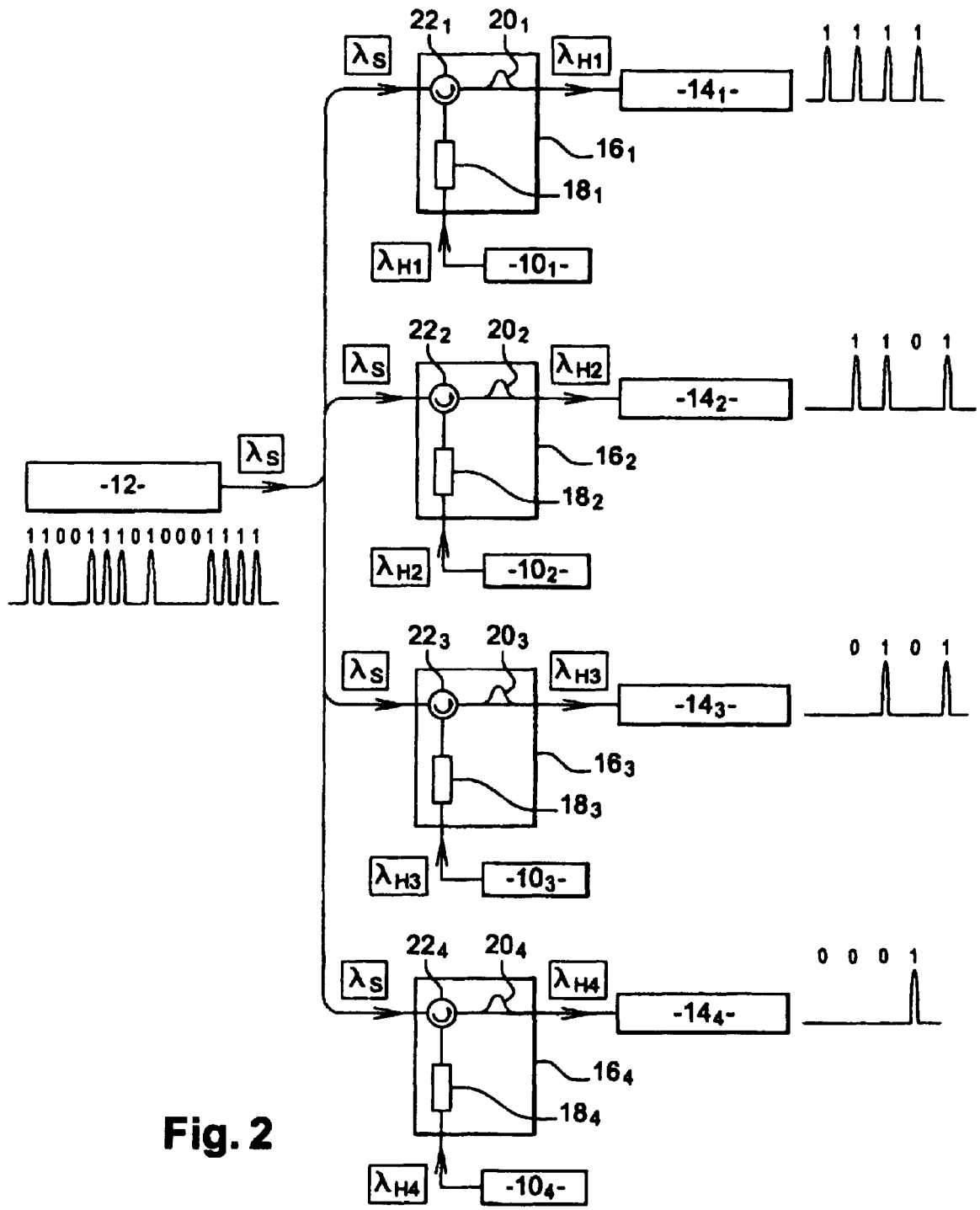
FIG. 2 is a diagram of the structure of an OTDM-WDM converter of the invention.

The temporal subsampling device described above can be used in an OTDM-WDM converter, as shown in FIG. 2.

In this circuit, a plurality of wavelength converter devices $16_1$, $16_2$, $16_3$, $16_4$ identical to the device 16 are connected in parallel and are all connected to the receiver 12.

Each converter device $16_i$ also receives at the first input of the linear optical amplifier $18_i$ the signal supplied by a generator $10_i$ of clock pulses transmitted at a frequency equal to one quarter of the frequency of the OTDM type optical signal supplied by the receiver 12. Each clock pulse generator $10_i$ is offset relative to the clock pulse generator $10_{i-1}$ by one bit period corresponding to the frequency of the OTDM optical signal.

Four output signals are therefore obtained at four connection interfaces $14_1$, $14_2$, $14_3$, and $14_4$ showing subsampling of the OTDM type optical signal at one quarter of its frequency. This means that if the OTDM type signal is the result of multiplexing four source temporal signals, this circuit produces those four signals at its output.

Each clock pulse generator $10_i$ generates signals at a wavelength $\lambda_{Hi}$ that is specific to it.

For example, $\lambda_{H1}$=1544.5 nm, $\lambda_{H2}$=1546.3 nm, $\lambda_{H3}$=1548.1 nm, $\lambda_{H4}$=1549.9 nm. The four subsampled signals obtained can then be combined to obtain a WDM type multiplexed signal.

Thus a converter is obtained for converting an OTDM type optical signal into a WDM type optical signal.

Figure 3:
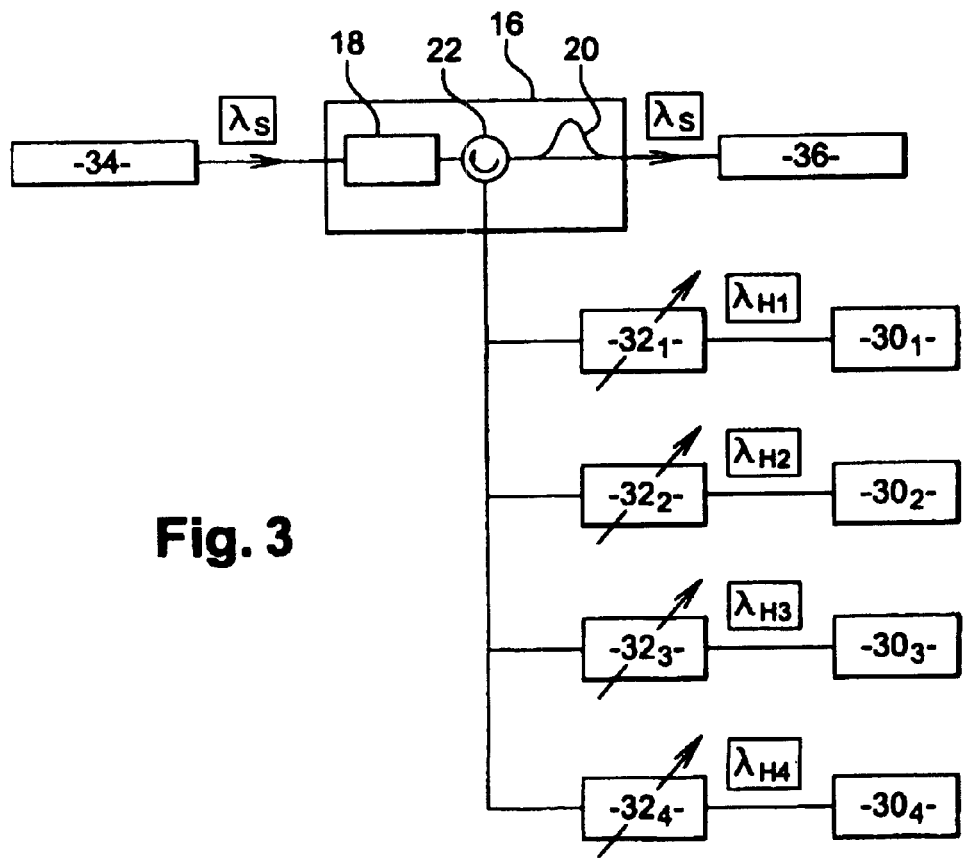
FIG. 3 is a diagram of the structure of a first embodiment of a WDM-OTDM converter of the invention.

Using the same principle, a WDM-OTDM converter constituting a first embodiment of the invention can be produced, as shown in FIG. 3.

Like the previous circuits, the circuit shown in this figure includes a wavelength converter device 16 comprising a linear optical amplifier 18, a circulator 22 and a delayed differential Mach-Zehnder interferometer 20.

In this circuit, the first terminal of the linear optical amplifier 18 is connected to a generator 34 for generating a continuous wave signal transmitted at a predetermined conversion wavelength, for example $\lambda_S$=1555.5 nm.

The circulator 22 between the linear optical amplifier 18 and the delayed differential Mach-Zehnder interferometer 20 is also connected to means for supplying a WDM type optical signal, i.e. an optical signal consisting of a plurality of wavelength-division multiplexed optical signals, each transmitted at its own wavelength.

These means for supplying a WDM type optical signal consist of multiplexed optical signal receiver means $30_1$, $30_2$, $30_3$, and $30_4$ connected in parallel and each associated with a respective delay unit $32_1$, $32_2$, $32_3$, and $32_4$.

These delay units time shift the multiplexed optical signals coming from the optical signal receiver means $30_1$, $30_2$, $30_3$, and $30_4$ by a bit period equivalent to the multiple frequency required at the output of the OTDM type optical signal. In the situation shown, because the WDM signal consists of four source signals, that frequency is equal to four times the temporal frequency of the source multiplexed optical signals.

A connection interface 36 at the output of the WDM-OTDM converter supplies an OTDM type optical signal at the required multiple temporal frequency and at the wavelength $\lambda_S$.

Figure 4:
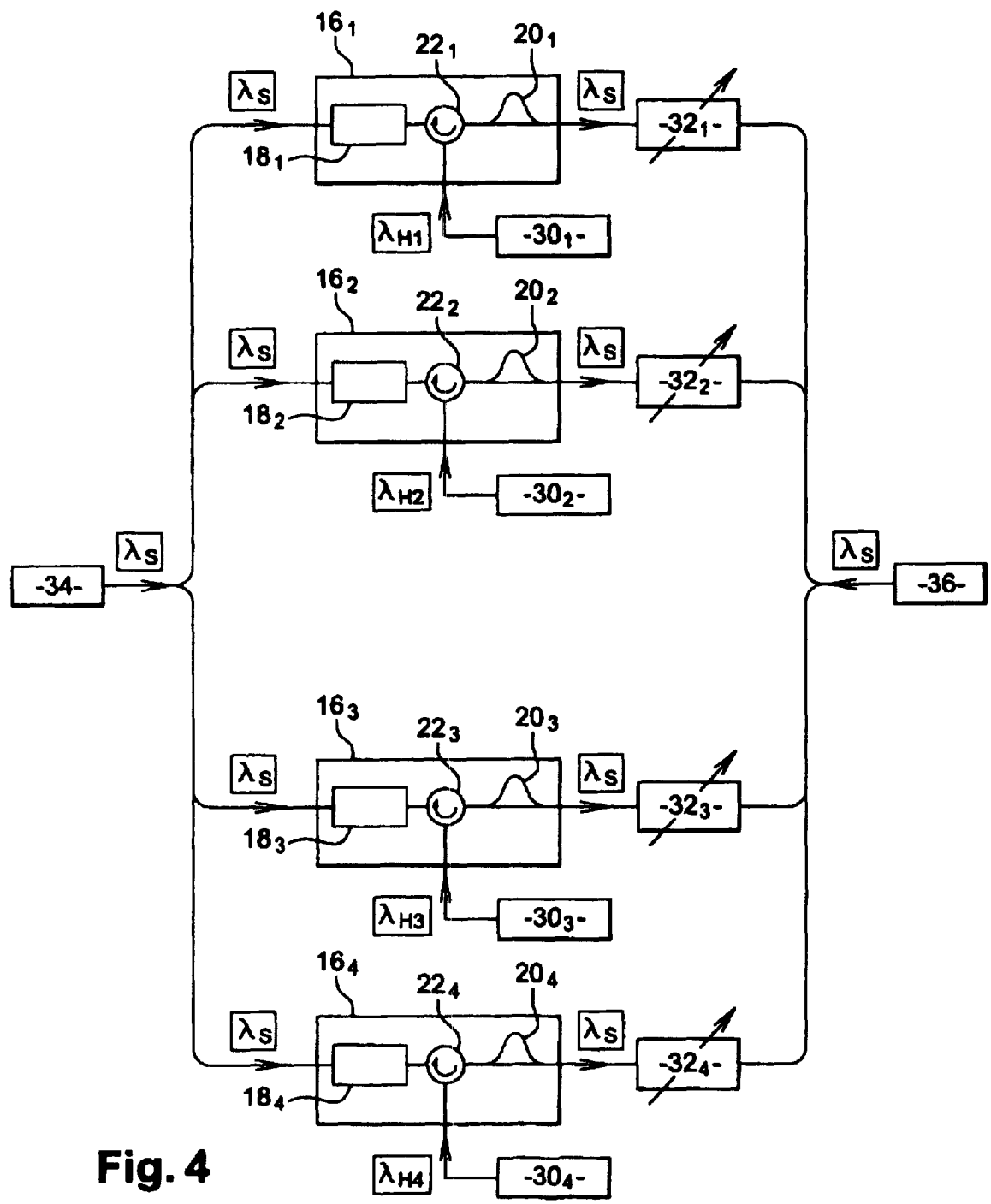
FIG. 4 is a diagram of the structure of a second embodiment of a WDM-OTDM converter of the invention.

FIG. 4 shows another embodiment of this WDM-OTDM converter.

In this figure the same number of wavelength converter devices $16_1$, $16_2$, $16_3$, and $16_4$ as there are means $30_1$, $30_2$, $30_3$, and $30_4$ for supplying wavelength-division multiplexed optical signals are connected in parallel.

In this configuration, the delay units $32_1$, $32_2$, $32_3$, and $32_4$ may be placed at the output of each of the wavelength converter devices before the output signals are combined to produce the required OTDM type signal.

It is clear that the devices described above constitute a simple all-optical technique for achieving temporal subsampling, WDM-OTDM conversion, and OTDM-WDM conversion. Combining a linear optical amplifier with a delayed differential Mach-Zehnder interferometer makes it possible to process signals at very high frequencies, for example frequencies greater than 160 GHz for the OTDM type optical signal.

What is claimed is:

1. A converter for converting an OTDM type optical signal into a WDM type optical signal, the WDM type optical signal being an optical signal comprising a plurality of wavelength-division multiplexed optical signals, each transmitted at an associated wavelength, characterized in that it comprises a plurality of devices connected in parallel for temporally subsampling the OTDM type optical signal at a predetermined subsampling frequency, each temporal subsampling device comprising:

a generator for generating clock pulses transmitted at the predetermined subsampling frequency and at a conversion wavelength specific to the subsampling device and corresponding to the wavelength associated with an optical signal among said plurality of wavelength-division multiplexed optical signals, and a wavelength converter device adapted to receive at its input the OTDM type optical signal and the clock pulses at the conversion wavelength specific to the subsampling device in order to supply at its output a subsampled signal of the optical signal at the conversion wavelength, the converter device comprising:

a linear optical amplifier adapted to receive the OTDM type optical signal and the clock pulses propagating in the opposite direction, the maximum linear power of the amplifier being adjusted so that it can be less than the peak power of the OTDM type optical signal, and a phase modulation to amplitude modulation converter.

2. A converter according to claim 1 for converting an OTDM type optical signal into a WDM type optical signal, wherein the phase modulation to amplitude modulation converter comprises a delayed differential Mach-Zehnder interferometer.

3. A converter according to claim 2 for converting an OTDM type optical signal into a WDM type optical signal, comprising a circulator between the amplifier and the modulation converter in order to direct the OTDM optical signal to the amplifier and the output signal of the amplifier to the modulation converter.

4. A converter according to claim 1 for converting an OTDM type optical signal into a WDM type optical signal, comprising a circulator between the amplifier and the modulation converter in order to direct the OTDM optical signal to the amplifier and the output signal of the amplifier to the modulation converter.

5. A converter according to claim 1, wherein a pulse generator of the plurality of generators is offset relative to another generator of the plurality of generators by an amount of time corresponding to a frequency of the OTDM type optical signal.

* * * * *